(12) United States Patent
Cheng et al.

(10) Patent No.: US 12,277,769 B2
(45) Date of Patent: Apr. 15, 2025

(54) METHOD FOR DEEP NEURAL NETWORK FUNCTIONAL MODULE DEDUPLICATION

(71) Applicant: Baidu USA LLC, Sunnyvale, CA (US)

(72) Inventors: Yueqiang Cheng, Sunnyvale, CA (US); Haofeng Kou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 237 days.

(21) Appl. No.: 17/031,621

(22) Filed: Sep. 24, 2020

(65) Prior Publication Data

US 2022/0092313 A1 Mar. 24, 2022

(51) Int. Cl.
G06V 20/52 (2022.01)
G06N 3/08 (2023.01)
(Continued)

(52) U.S. Cl.
CPC ............ G06V 20/52 (2022.01); G06N 3/08 (2013.01); G06N 20/00 (2019.01); G06V 40/10 (2022.01);
(Continued)

(58) Field of Classification Search
CPC ...... G06V 20/52; G06V 40/10; G06V 40/171; G06V 20/625; G06V 2201/08; G06V 10/40; G06N 3/08; G06N 20/00; G06N 3/0454
See application file for complete search history.

(56) References Cited

U.S. PATENT DOCUMENTS

2016/0378861 A1* 12/2016 Eledath ............... G06V 20/52
707/766
2018/0307912 A1* 10/2018 Selinger ............ G06V 10/764
2021/0142055 A1* 5/2021 Broggi ................ G08G 1/01

FOREIGN PATENT DOCUMENTS

CN 109635656 A 4/2019
CN 111339977 A 6/2020

OTHER PUBLICATIONS

Putra, M. H., et al. "Convolutional neural network for person and car detection using yolo framework." Journal of Telecommunication, Electronic and Computer Engineering (JTEC) 10.1-7 (2018): 67-71. (Year: 2018).*

(Continued)

Primary Examiner — Amandeep Saini
Assistant Examiner — Denise G Alfonso
(74) Attorney, Agent, or Firm — WOMBLE BOND DICKINSON (US) LLP

(57) ABSTRACT

In one embodiment, an image sensor captures an image and passes the image to an image processing system that detects one or more vehicle objects and one or more human objects, using a single detection function having a single artificial intelligence (AI) model. Each of the detected objects correspond to a portion of the captured image. For each vehicle object, the corresponding image portion is processed to determine a plurality of properties of the vehicle, including, e.g., type (truck, van, sedan, motorcycle, etc.), color, and license number. For each human object, the corresponding portion of the image is processed to determine a plurality of properties of the human, e.g., gender, approximate age, skin tone, eye color, hair color, and facial landmarks for facial recognition. The captured image is annotated to describe the objects and their properties, and annotated image is transmitted to a service for use by an application.

17 Claims, 8 Drawing Sheets

(51) Int. Cl.
  *G06N 20/00* (2019.01)
  *G06V 40/10* (2022.01)
  *G06V 40/16* (2022.01)
  *G06V 20/62* (2022.01)

(52) U.S. Cl.
  CPC .......... *G06V 40/171* (2022.01); *G06V 20/625* (2022.01); *G06V 2201/08* (2022.01)

(56) References Cited

OTHER PUBLICATIONS

Yaprakkaya, Gökhan. Face identification, gender and age groups classifications for semantic annotation videos. MS thesis. Middle East Technical University, 2010. (Year: 2010).*

Forero, Alejandro, and Francisco Calderon. "Vehicle and pedestrian video-tracking with classification based on deep convolutional neural networks." 2019 XXII Symposium on Image, Signal Processing and Artificial Vision (STSIVA). IEEE, 2019. (Year: 2019).*

* cited by examiner

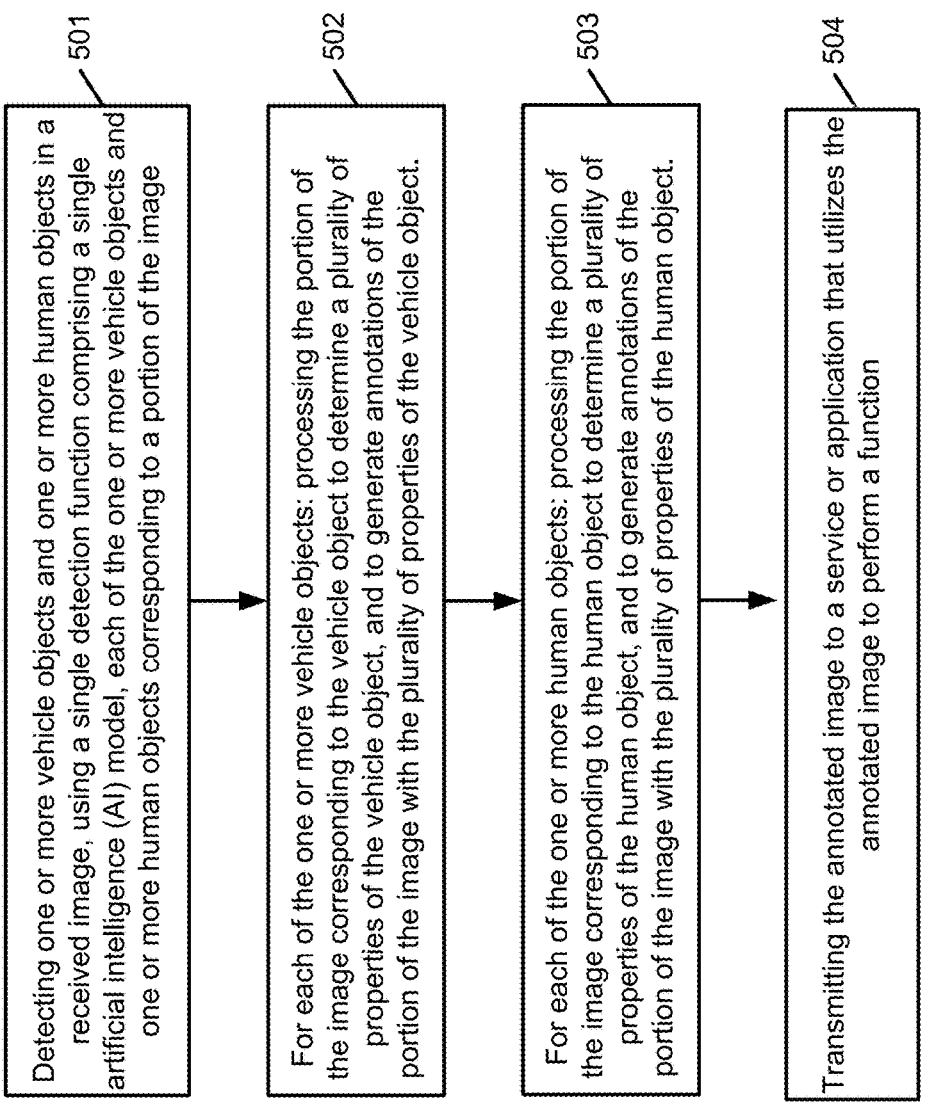

METHOD FOR DEEP NEURAL NETWORK FUNCTIONAL MODULE DEDUPLICATION

TECHNICAL FIELD

Embodiments of the present disclosure relate to automated vision processing. More particularly, embodiments of the disclosure relate to improving performance of automated vision processing systems.

BACKGROUND

Deep neural networks are increasingly popular in a variety of applications. In the prior art, a basic classification or detection neural network model can solve quite a few different types of problems, provided that the model is adequately trained with comprehensive data. Several popular neural network model types include single shot multi-box detector (SSD), residual neural network (ResNet), and you-only-look-once (YOLO).

In real-world computer vision applications, after collecting an image, sensor and lens sub-systems store the image data into a system that supports multiple software functions in order to reduce total processing cost by using a same set of hardware to process the multiple functions. Multiple detection neural networks are applied to the input data (e.g., an image) using different weights to detect objects for different applications. For example, in a smart city use case, one camera can be used to monitor a crosswalk environment, including vehicles and humans. To detect the vehicles and humans in an image captured by the camera, at least two or more functional modules are run in parallel on the system: one for detecting people and one for detecting vehicles such as cars, trucks, or bikes. Each of these functional modules start with a detection neural network as the first step, but then parse the detection result for different purposes: (1) a human neural network focuses on the people's traits after detection (e.g. age, gender, etc.), (2) a vehicle neural network focuses on vehicle/bicycle properties after detection. Having separate detection functions, one for detecting vehicles and one for detection humans, uses a great deal of computational resources. An image must be processed with one model to detect human objects in an image, and another copy of the image is processed with another model to detect vehicle objects in the same image. Thus, two models need to be in memory and executing, to detect two types of objects in the image. Further, a second copy of the captured image is typically kept in memory for the second model to detect vehicle objects. Thus, the prior art methods of detecting both humans and vehicles in a single image require memory for two models, computational power for two models, and memory for two copies of the captured image.

Previous solutions to above inefficiencies have been:
1. Adding new hardware to detect each new object type. This solution increases cost of the vision processing system.
2. Upgrading an existing system to a more powerful processor. Although this solution does not introduce a completely new system, the upgraded system costs more than a single system, due to the upgrading.
3. Program different and separated functional modules for each application (e.g. detecting humans and detecting vehicles). This solution does not introduce new hardware cost but this solution does slow down the existing system and uses more memory and more processing power.

BRIEF DESCRIPTION OF THE DRAWINGS

Embodiments of the disclosure are illustrated by way of example and not limitation in the figures of accompanying drawings in which like references indicate similar elements.

FIG. 5 illustrates a method of implementing deep neural network functional module deduplication, according to one embodiment.

DETAILED DESCRIPTION

Figure 1A:
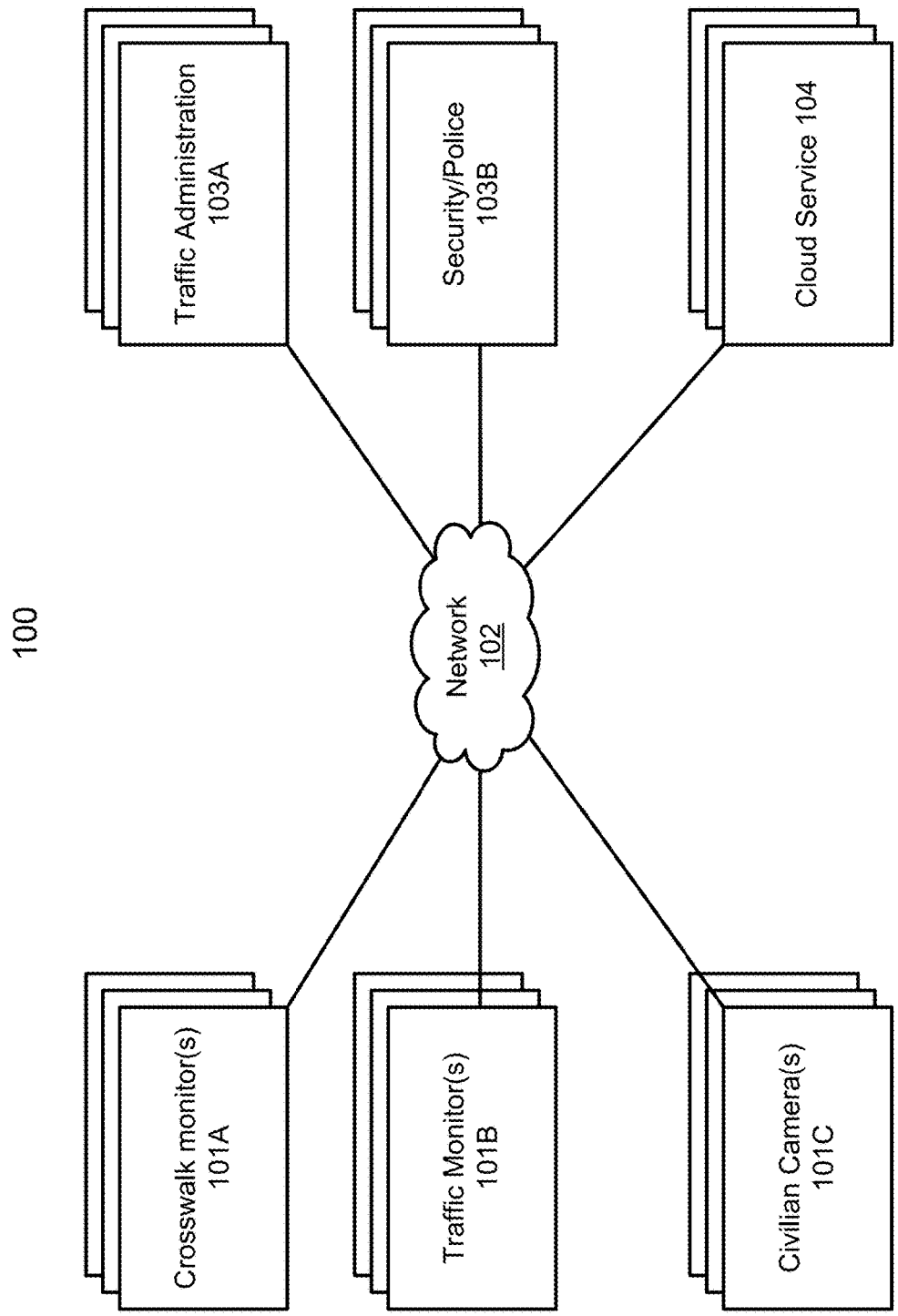
FIG. 1A illustrates, in block form, a networked system that can implement a method for deep neural network functional module deduplication, according to one embodiment.

Various embodiments and aspects of the disclosures will be described with reference to details discussed below, and accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method that implements deep neural network functional module deduplication includes: detecting one or more vehicle objects and one or more human objects in a received image, using a single detection function comprising a single artificial intelligence (AI) model. Each of the one or more vehicle objects and each of the one or more human objects correspond to a portion of the image. Each of the one or more vehicle objects have a plurality of properties that are determined by processing the portion of the image corresponding to the vehicle object. Vehicle properties can include a type of vehicle (e.g. sedan, truck, motorcycle, sport utility vehicle, van, et al.), a license number of the vehicle, and a color of the vehicle (e.g. white, black, silver, tan, blue, red, green, etc.). Annotations are generated for the processed portion of the image to identify the plurality of properties of the vehicle object. In an embodiment wherein the image is captured using a RADAR or LIDAR system, vehicle properties may further speed and heading of the vehicle. In an embodiment, annotations for both human objects and vehicle objects can include a date and time at which the image was captured, and a location of the image capture device that captured the image in which the human and vehicle objects appear. Annotations can be in the form of metadata associated with the image.

Similarly, each of the one or more human objects has a plurality of properties that are determined by processing the portion of the image corresponding to the human object. Human properties can include an approximate age of the person, a skin tone, an eye color, a hair color, a gender, and facial landmarks of the person's face, etc. Annotations are generated for the processed portion of the image to identify the plurality of properties of the human object. Annotations can further include a date/time stamp, having both a date and a time, of when the image was captured. Annotations can also include a location where the image was captured. Location can include any/all of a serial number or other identifier of the device that captured the image (assuming that the location of the image capture device, once identified, is known), an Internet Protocol address or other network address associated with the image device that captured the image, a geo-location, such as a Global Positioning Satellite (GPS) location, map coordinates associated with a high-resolution map, such as may be used in an autonomous driving vehicle, or other location identification scheme.

The annotated received image can be transmitted to a service or application that utilizes annotated image to perform a function of the service or application. In an embodiment, the single AI model used to detect both the human objects and the vehicle objects has a substantially same number of nodes and layers as an AI model that detects only vehicle objects or only human object, such that the AI model uses a substantially same amount of memory space to detect the vehicle objects and human objects as an AI model of the prior art that detects only humans or only vehicles. In an embodiment, the human objects and vehicle objects are detected using only a single copy of the captured image, which saves memory space. In an embodiment, the single detection function and the single AI model remain cached such that, when a second image is received, the second image can be processed to detect human objects and vehicle objects without reloading the AI model into memory.

FIG. 1A illustrates, in block form, a networked system that can implement a method for deep neural network (DNN) functional module deduplication, according to one embodiment. The networked system 100 can include crosswalk monitoring system(s) 101A, traffic monitoring system(s) 101B, civilian camera(s) 101C and autonomous driving vehicles 150 (shown in FIG. 1B). Crosswalk monitoring system 110A can include a plurality of image capture devices strategically placed to capture images of people, vehicles, and other items within the crosswalk. A crosswalk monitoring system 101A can also be used to monitor multiple crosswalks, such as at an intersection. In a traffic monitor application, traffic monitors 101B can include a plurality of image capture devices strategically positioned to capture images of lanes of traffic that may have a high number of vehicles traveling on the lanes, or to capture images where a high number of traffic accidents have been reported, or other traffic monitoring application. Civilian camera(s) 101C can include one or more civilian cameras placed at locations chosen by the civilian controlling the camera, and the civilian camera may transmit captured images to a service, e.g. cloud service 105 or security/police 103B. A civilian may be motivated to provide captured images from the civilian camera(s) for a particular purpose such as increasing the safety of potential customers near the civilians' store, or to increase security of neighborhoods by providing images to a security service or to police.

Each of the systems 101A-101C and 150 ("detecting systems") includes one or more image capture devices, such as a CCD camera, light detection and ranging (LIDAR) device, radio detection and ranging (RADAR) device, or other image capture device. The image capture devices are placed at locations that are deemed relevant to the system's purpose. See, e.g. FIG. 4, described below, for a crosswalk monitoring system 101A and/or traffic monitoring system 101B. In an embodiment, each image capture device can include an image processing system that detects one or more human objects and one or more vehicle objects in an image captured by the image capture device. In an embodiment, the image capture device may be communicatively coupled to an image processing system with the image processing system located in a separate physical location than the image capture device. Such physical separation of the image capture device and image processing system can be for reasons of environmental protecting for the image processing system or for securing the image processing system so that the image processing system cannot be compromised or tampered with.

Images captured by the detecting systems 101A-101C and 150 can be processed by an image processing system to generate an annotated version of the captured images. The annotated version of a captured image includes information that identifies one or more human objects and one or more vehicle objects identified by the image processing system as being contained within the captured image. Each identified object can have one or more properties identified by the image processing system. In an embodiment, a human object may have properties that include a gender of the person, an approximate age, a hair color, eye color, skin tone, and one or more facial landmarks as may be used in facial recognition systems. In an embodiment, vehicle properties can include a license number of the vehicle, a type of the vehicle (e.g. sedan, truck, motorcycle, van, SUV, etc.) and a color of the vehicle (e.g. black, white, brown, silver, red, green, blue, etc.). Other vehicle properties may include a make, model, approximate year of manufacture of the vehicle identified in the vehicle object, and any damage to the vehicle such as a cracked windshield, bent bumper, or bent fender, and the like.

Detecting systems 101A-101C and 150 can transmit the image, annotated with properties of the vehicle objects and human objects identified in the image, to one or more services or applications 103A-103B, or 104. For example, the service or application can be a crosswalk monitoring system and/or traffic monitoring system 103A, a security or police service 103B, or a cloud service 104. A crosswalk monitoring system, a traffic monitoring and/or control system such as traffic administration 103A can monitor captured images for traffic law violations, stolen cars, unsafe conditions to pedestrians or vehicles at a crosswalk or other traffic administration function. A security/policing system 103B can be a private security system, which may receive images from, e.g. civilian cameras 101C, or public/state policing system 103B that may be attempting to locate a stolen vehicle, or a wanted person. Cloud service 104 can act as a storage system for annotated processing images. Cloud service may receive images from other services, e.g. 103A-103B, or cloud service 104 may receive annotated processed images from detection systems 101A-101C and provide the images to services 103A-103B or other services. Other services can include, but are not limited to, insurance services that may wish to access annotated processed images showing persons or vehicles who may have been involved in an accident either to determine fault or to determine the identity of potential witnesses to accident, or the license number of a vehicle that may have fled the scene of an accident. Services may also include identifying missing persons, stolen vehicles, and the like.

Each service 103A-103B and 104 can be implemented on one or more server systems. Server(s) 103A-103B, or 104 may be any kind of servers or a cluster of servers, such as Web or cloud servers, application servers, backend servers, or a combination thereof. Servers 103A-103B and 104 may be data analytics servers, content servers, traffic information servers, map and point of interest (MPOI) servers, or location servers, security information servers, police information servers, etc. Detection systems 101A-101C and services 103A-103B and 104 can be interconnected by network 102. Network 102 may be any type of network such as a local area network (LAN), a wide area network (WAN) such as the Internet, a cellular network, a satellite network, or a combination thereof, wired or wireless.

In an embodiment for an autonomous driving vehicle (ADV), one or more image capture devices can be a part of a sensor system of the ADV. Further, one or more corresponding image processing devices may be a part an image capture system. Thus, the application or service that uses annotated image generated by the image processing system can be incorporated into the ADV along with the image capture device. The annotated image can be used by a perception and planning module of the ADV to aid in navigating the ADV. Such an embodiment is described below with respect to FIG. 1B.

Figure 1B:
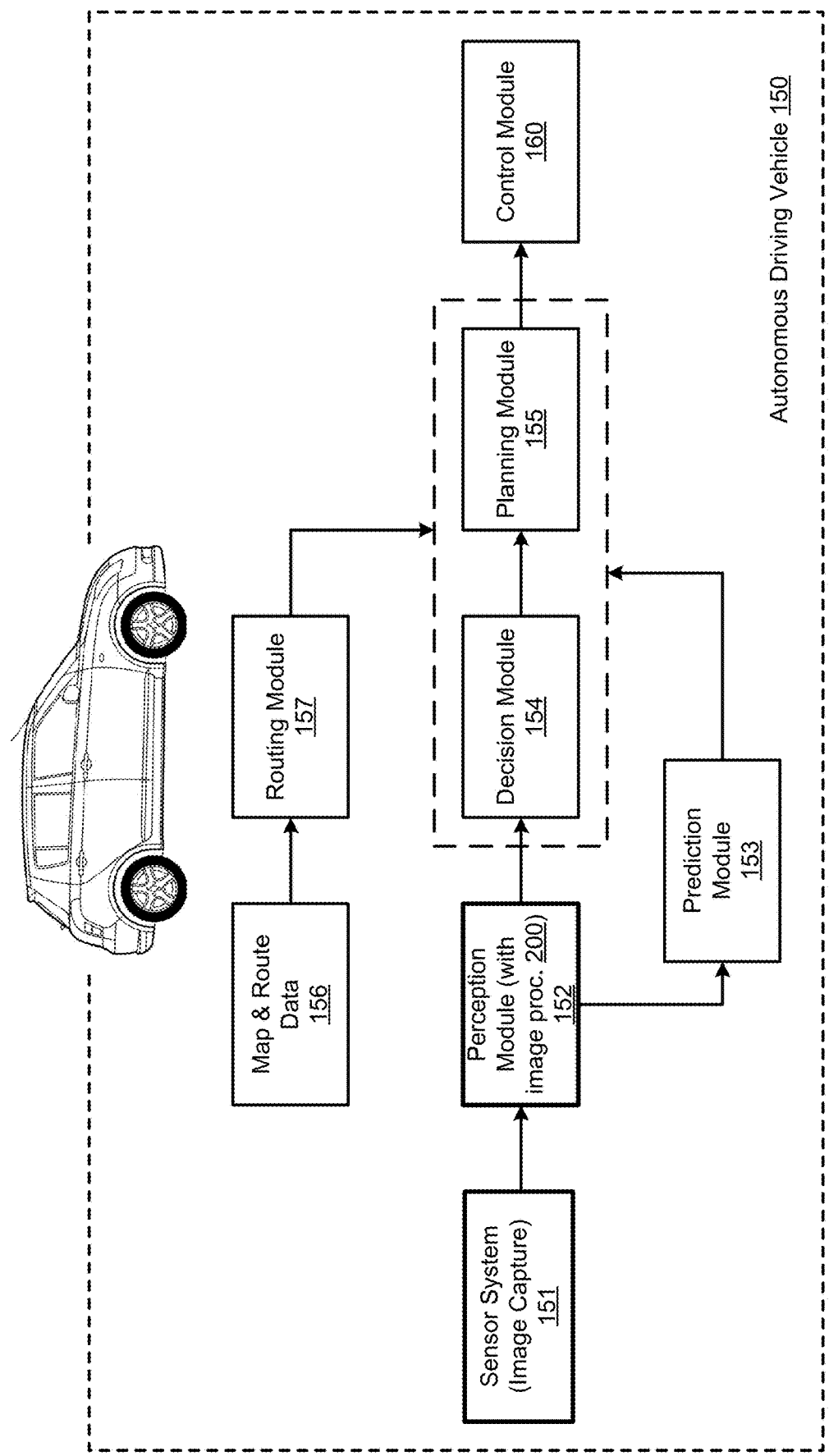
FIG. 1B illustrates, in block form, an autonomous driving vehicle that implement a method for deep neural network functional module deduplication, according to one embodiment.

FIG. 1B illustrates, in block form, an autonomous driving vehicle (ADV) 150 that implements a method for deep neural network functional module deduplication, according to one embodiment. FIG. 1B describes an example use case for the image processing system that uses the method for deep neural network functional module deduplication described herein. A sensor module of the ADV, described below, provides a source for captured images.

An ADV 150 can include a sensor system 151, a perception module 152, a prediction module 153, a decision module 154, a planning module 155, a map and route data module 156, a routing module 157, and a control module 160. In embodiments of the present disclosure, in an ADV 150, the sensor module 151 includes one or more cameras that are image capture devices. LIDAR or RADAR sensors of the ADV sensor system 151 can also be image capture devices. The perception module 152 includes an image processing system as described below with respect to FIG. 3.

Sensor system 151 can include one or more cameras (not shown), a global positioning system (GPS) (not shown), inertial measurement unit (not shown), radar unit (not shown), and a light detection and range (LIDAR) unit (not shown). The GPS system may include a transceiver operable to provide information regarding the position of the ADV. The inertial measurement unit may sense position and orientation changes of the ADV based on inertial acceleration. The radar unit may represent a system that utilizes radio signals to sense objects within the local environment of the ADV 150. In some embodiments, in addition to sensing objects, the radar unit may additionally sense the speed and/or heading of the objects. The LIDAR unit may sense objects in the environment in which the ADV is located using lasers. The LIDAR unit can include one or more laser sources, a laser scanner, and one or more detectors, among other system components. The cameras may include one or more devices to capture images of the environment surrounding the ADV. The cameras may be still cameras and/or video cameras. A camera may be mechanically movable, for example, by mounting the camera on a rotating and/or tilting a platform. LIDAR, RADAR, the camera(s) or a combination thereof may be considered image capture devices for purposes of this disclosure.

Sensor system 151 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Based on the sensor data provided by sensor system 151 and localization information obtained by a localization module (not shown), a perception of the surrounding environment is determined by perception module 152. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc. The perception module 152 receives one or more captured images from the sensor system 151.

Figure 3:
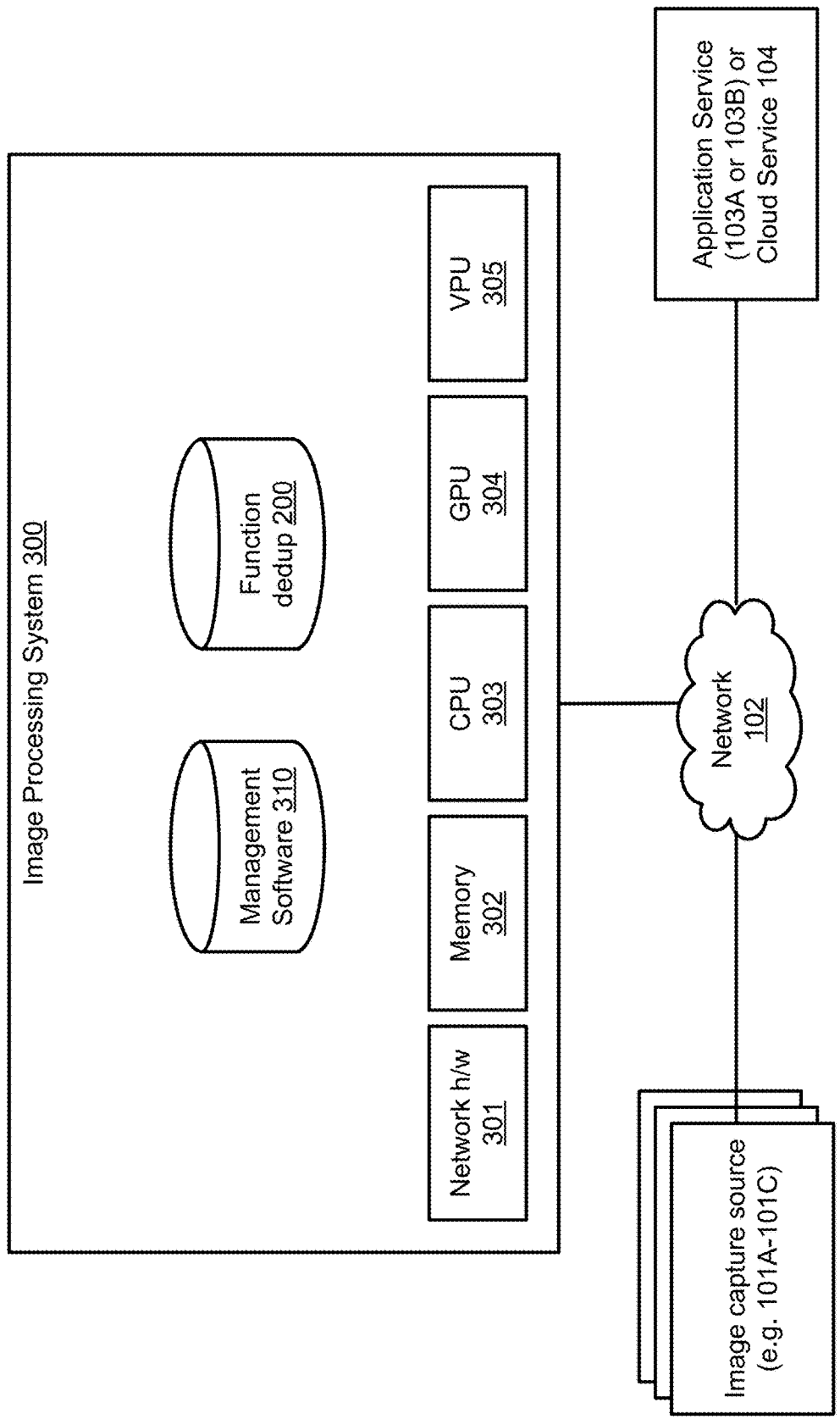
FIG. 3 illustrates, in block form, internal components of an image processing module that can implement deep neural network functional module deduplication, according to one embodiment.

Perception module 152 may include a computer vision system or functionalities of a computer vision system to process and analyze images captured by one or more image capture devices of the sensor system 151 in order to identify objects and/or features in the environment of the ADV, such as an image processing system as described below with reference to FIG. 3. The objects can include traffic signals, road way boundaries, other vehicles, pedestrians, temporary traffic control devices (TTCDs) and/or obstacles, etc. The computer vision system may use an object recognition algorithm, video tracking, and other computer vision techniques. In some embodiments, the computer vision system can map an environment, track objects, and estimate the speed of objects, etc. Perception module 152 can also detect objects based on other sensors data provided by other sensors such as a radar and/or LIDAR.

For each of the objects detected by then one or more sensors, prediction module 153 predicts how the object will behave under the circumstances. The prediction is performed based on the perception data perceiving the driving environment at the point in time in view of a set of map/route information 156 and traffic rules. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 153 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects (e.g. human or vehicle), decision module 154 makes a decision regarding how to handle the object. For example, for a particular object (e.g., another vehicle in a crossing route) as well as its metadata describing the object (e.g., a speed, direction, turning angle), decision module 154 decides how to encounter the object (e.g., overtake, yield, stop, pass). Decision module 154 may make such decisions according to a set of rules such as traffic rules or driving rules 312, which may be stored in persistent storage device.

Routing module 157 is configured to provide one or more routes or paths from a starting point to a destination point. For a given trip from a start location to a destination location, for example, received from a user, routing module 157 obtains route and map information (not shown) and determines all possible routes or paths from the starting location to reach the destination location. Routing module 157 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. Topographic maps are then provided to decision module 154 and/or planning module 155. Decision module 154 and/or planning module 155 examine all of the possible routes to select and modify one of the most optimal routes in view of other data provided by other modules such as traffic conditions from a localization module (not shown), driving environment perceived by perception module 152, and traffic condition predicted by prediction module 153. The actual path or route for controlling the ADV may be close to or different from the reference line provided by routing module 157 dependent upon the specific driving environment at the point in time.

Based on a decision for each of the objects perceived, planning module 155 plans a path or route for the ADV, as well as driving parameters (e.g., distance, speed, and/or turning angle), using a reference line provided by routing module 157 as a basis. That is, for a given object, decision module 154 decides what to do with the object, while planning module 155 determines how to do it. For example, for a given object, decision module 304 may decide to pass the object, while planning module 155 may determine whether to pass on the left side or right side of the object. Planning and control data is generated by planning module 155 including information describing how vehicle 150 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 156 controls and drives the ADV, by sending proper commands or signals to a vehicle control system (not shown), according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 155 plans a next route segment or path segment, for example, including a target position and the time required for the ADV to reach the target position. Alternatively, planning module 155 may further specify the specific speed, direction, and/or steering angle, etc. In one embodiment, planning module 155 plans a route segment or path segment for the next predetermined period of time such as 5 seconds. For each planning cycle, planning module 155 plans a target position for the current cycle (e.g., next 5 seconds) based on a target position planned in a previous cycle. Control module 160 then generates one or more control commands (e.g., throttle, brake, steering control commands) based on the planning and control data of the current cycle.

Note that decision module 154 and planning module 155 may be integrated as an integrated module. Decision module 154/planning module 155 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via a user interface system (not shown). The navigation system may update the driving path dynamically while the ADV is in operation. The navigation system can incorporate data from a GPS system and one or more maps so as to determine the driving path for the ADV.

Figure 2:
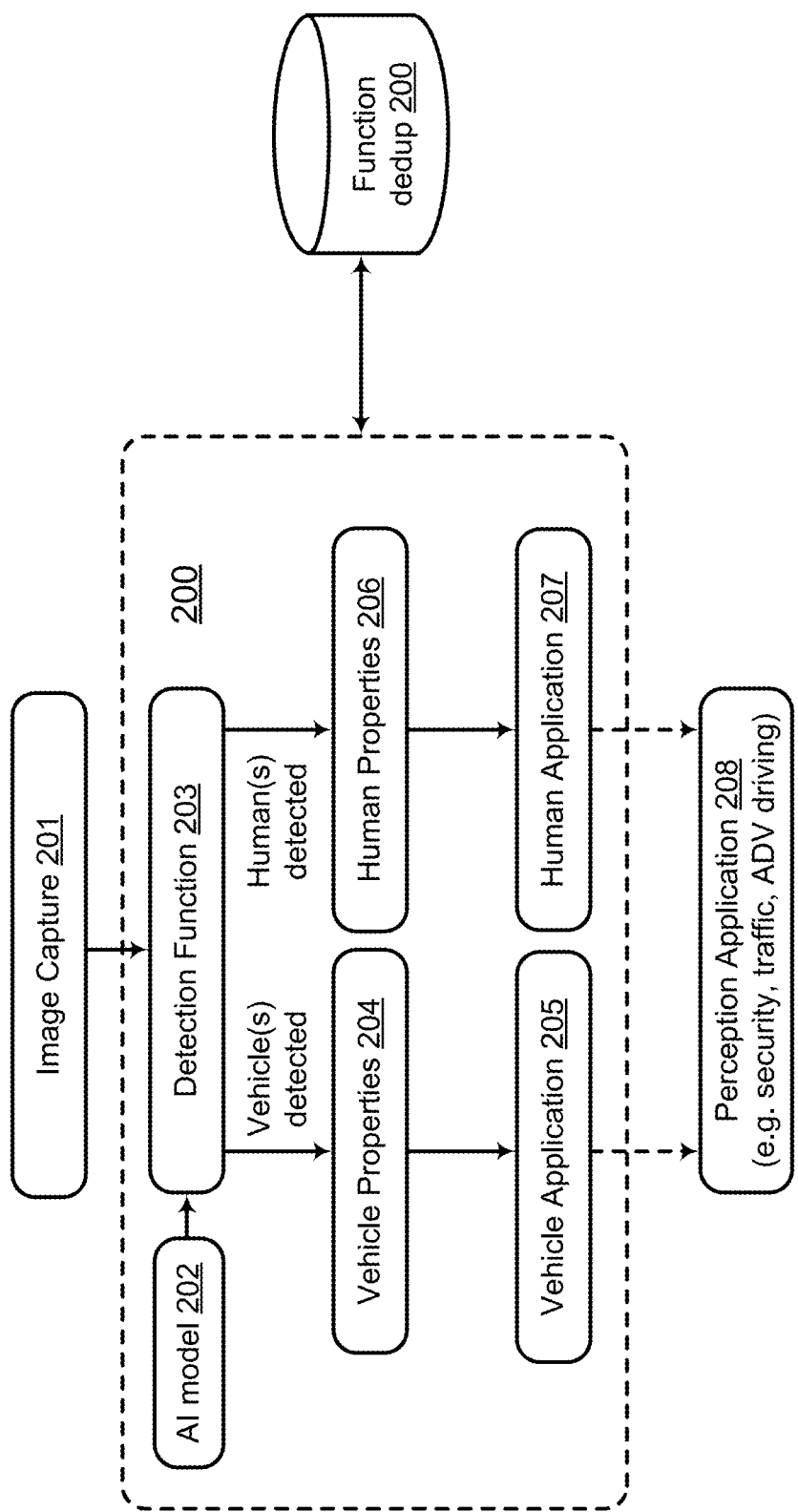
FIG. 2 illustrates, in block form, a detailed view of a system (networked or autonomous driving) that can implement deep neural network functional module deduplication, according to one embodiment.

FIG. 2 illustrates, in block form, a detailed view of a system 200 (networked or autonomous driving) that can implement deep neural network (DNN) functional module deduplication, according to one embodiment.

An image capture device 201 captures an image and transmits the captured image to the DNN functional module deduplication 200. In an embodiment wherein the image capture device and image processing system is the same device, the image processing system 200 may simply read the captured image 201 into memory from the image capture device. A detection function 203 of the image processing system receives the captured image 201 and also receives and artificial intelligence (AI) model 202. The AI model 202 can be a DNN AI model having multiple nodes and layers. The AI model 202 is trained to detect both human objects and vehicle objects. In an embodiment, the AI model 202 is substantially a same size in memory as an AI model that only detects humans or only detects vehicles. In an embodiment, the AI model 202 that detects both vehicles and humans can have substantially a same number of nodes and layers as an AI model that is trained to detect only humans or only vehicles. In an embodiment, the detection function 203 and AI model 202 can remain resident in memory, such as in a cache, between processing a first image and processing a second image to minimize reloading of the AI model 202. The AI model 202 is functionally deduplicated because the AI model 202 detects both humans and vehicles with a single AI model.

After the image has been processed by the AI model 202, the AI model 202 will have detected one or more vehicle objects and one or more human objects in the captured image 201. The weights of the AI model 202 are passed to vehicle properties module 204 and human properties module 206. Vehicle properties module 204 will examine the weights of the AI model 202 to determine a plurality of properties of each vehicle object detected by the AI model 202. Similarly, human properties module 206 will examine the weights of the AI model 202 to determine a plurality of human properties of each human object detected by the AI Model 202.

In an embodiment, vehicle properties module 204 and human properties module 206 can be called in parallel, after the detection function 203 has detected the human objects and vehicle objects in the captured image 201. In embodiment, vehicle properties module 204 and human properties module 206 can be called serially to determine the properties of the one or more vehicle objects and one or more human objects detected in the captured image 201. The properties of each of the one or more vehicle objects, the corresponding portion of the captured image in which each vehicle object appears, and the AI model 202 weights, are passed to vehicle application 205.

Similarly, the properties of each of the one or more human objects, the corresponding portion of the captured image in which the human object appears, and the AI model 202 weights, are passed to the human application 207. In an embodiment, the portion of the image corresponding to each object, whether human or vehicle, can be passed by reference to the human or vehicle application, respectively. By passing a reference to the single copy of the captured image 201, amount of memory used to process the image can be reduced.

For each vehicle object detected in the captured image 201, vehicle application 205 can receive the vehicle properties and portion of the image (e.g. by reference) that corresponds to each object. Vehicle application 205 can then generate annotations to the captured image 201 for each identified vehicle object. Annotations to the captured image can be in the form of metadata that identifies, for each vehicle object in the captured image 201, the properties detected by vehicle properties module 204, the location of the portion of the image that the vehicle object appears in the captured image 201, a date/time stamp having both a date and a time that the image was captured, an identification of the image capture device that captured the image 201, and a location of the image capture device that captured the image 201.

Vehicle application 205 can perform image post-processing to enhance the portion of the captured image 201 corresponding to each vehicle object. Image enhancement can include interpolating points of resolution between image pixels (e.g., to sharpen the image), reducing glare in the image, or zooming in on the portion of the image corresponding to the object. Zooming in may be used to enhance an image of the license plate of the vehicle, or a portion of the vehicle that may have impacted or contacted a human object or other vehicle object, or enhancing identifying features of the vehicle, such as a manufacturer's logo or model name on the vehicle. Similarly, human application 207 can perform the same or similar types of enhancement operations for the human objects. Post-processing of portions of the captured image corresponding to human objects can include interpolating pixels to enhance facial landmarks, reducing glare, zooming in to determine eye color, and the like.

Vehicle application 205 and human application 207 can output annotations to image portions of detected vehicle objects and human objects, to the perception application 208 that will utilize the processed captured image for a useful functionality, such as a security monitoring system, crosswalk monitoring, traffic monitoring, or navigating an autonomous driving vehicle.

Function deduplication 200 can be implemented using hardware as described below with reference to FIG. 3. FIG. 3 illustrates internal components of an image processing system 300 that can implement deep neural network functional module deduplication 200, according to one embodiment.

Image processing system 300 can include functional deduplication module 200, as described above with reference to FIG. 2. Image processing system 300 can further include management software 310 and various hardware 301-305 described below. More, or less, hardware can be used to implement image processing system 300.

Management software 310 enables a system administrator to remotely, or locally, access a configuration of the image processing system 300 via, e.g. network interface 301. Image processing system 300 configuration can include setting or selecting a particular image capture device from which to receive images to process. Configuration can further include security settings to determine which services, e.g. 103A-B or 104, can receive processed images from image processing system 300. Configuration management software 310 can further enable downloading and storing into the memory 302 of the image processing system, and AI model, e.g. AI model 202 and other administrative functions. In an embodiment, the AI model is downloaded into a secure memory of the image processing system.

Image processing system can include a network interface 301, such as a universal serial bus (USB), internet protocol card or chipset, fiber-optic interface, or other network interface. Memory 302 can include read-only memory (ROM), volatile and/or non-volatile memory, random access memory (RAM), magnetic disk storage media, optical storage media, and flash memory.

Image processing system 300 can comprise an artificial intelligence (AI) processing system that includes a central processing unit 303, and at least a graphics processing unit 304 or a vision processing unit 305, coupled by a high-speed bus (not shown). A central processing unit 303 can be general purpose processor, an application specific integrated circuit (ASIC), a digital signal processor (DSP), a field programmable gate array (FPGA) or other processing type. A graphics processing unit (GPU) 304 can be a processing system containing one or more cores that is specifically designed to efficiently process graphics, such as captured images. Vision processing unit (VPU) 305 is a specific type of AI processor designed to accelerate machine vision tasks. Vision processing unit 305 can run one or more machine vision algorithms, such as convolution neural networks (CNN) scale-invariant feature transform (SIFT), and other AI algorithms. A VPU 305 may include a direct interface for receiving captured images from one or more cameras and can include multiple parallel execution units.

Image capture source(s) e.g. 101A-101C can be coupled to one or more application services 103A-B or 104 via network 102 as described above with reference to FIG. 1A. Image processing system 300 can also be used with an autonomous driving vehicle 150 as described above with reference to FIG. 1B.

Figure 4:
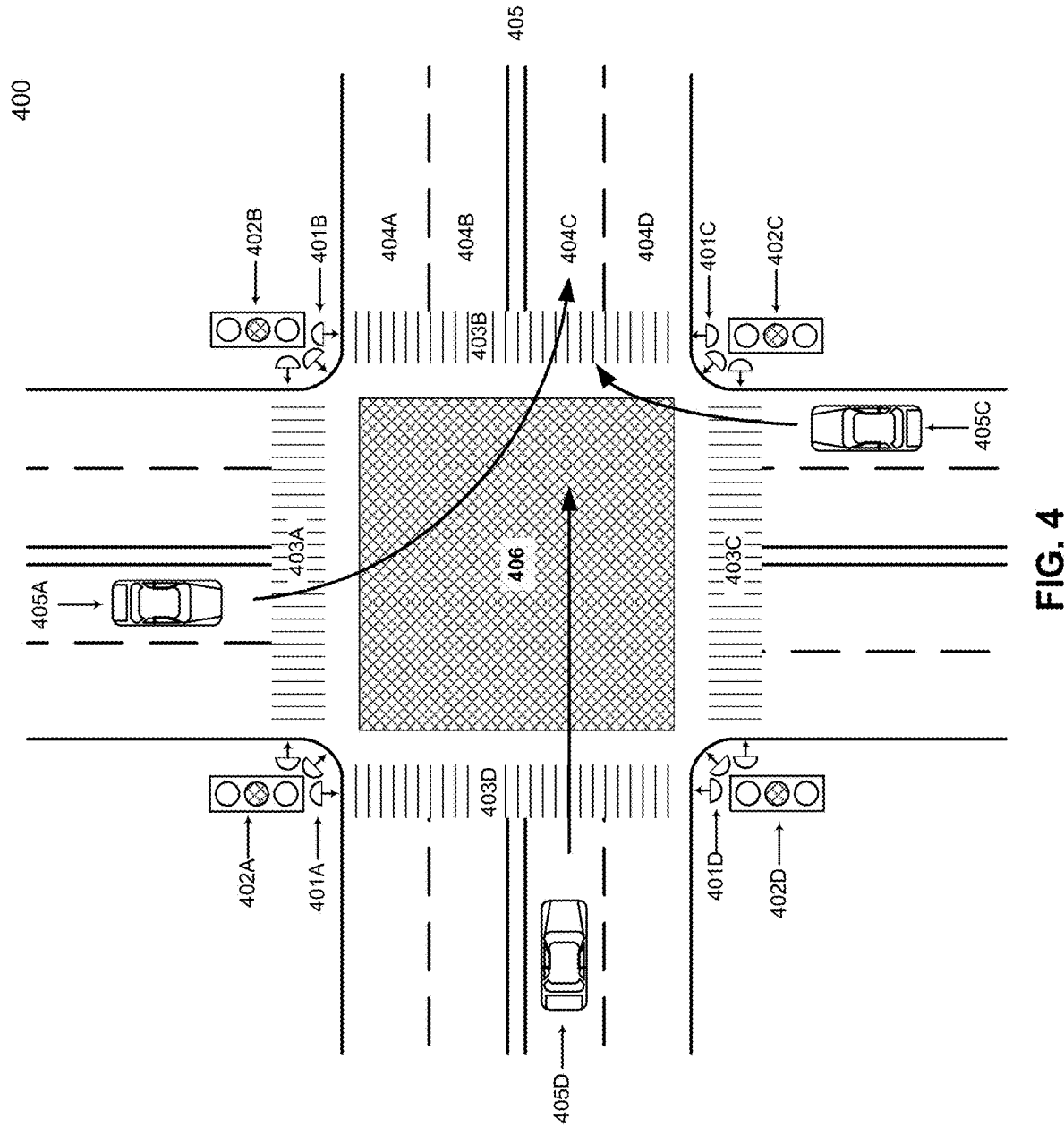
FIG. 4 illustrates an example environment wherein image capture assemblies that implement deep neural network functional module deduplication may be placed at corners of an intersection in a traffic/crosswalk monitoring use case, according to one embodiment.

FIG. 4 illustrates an example environment 400 wherein image capture assemblies 401A-401D may be placed at corners of an intersection 406. In an embodiment, image capture assemblies 401A-401D can each comprise one or more individual image capture devices, e.g. three image capture devices. Referring to image capture assembly 401A, a first image capture device is directed at the crosswalk 403A, a second image capture device is directed toward the center of the intersection 406, and a third image capture device of 401A is directed at crosswalk 403D. Each of image capture assemblies 401B-401D can also have three, or other number, individual image capture devices directed at a crosswalk 403A-403D and/or the intersection 406. An arrangement of image capture assemblies as shown in FIG. 4 can be used in a traffic monitoring service or a crosswalk monitoring service. Alternatively, or in addition, more or fewer image capture assemblies or individual image capture devices may be placed to monitor, e.g., lanes 404A-404D.

In FIG. 4, vehicle 405A is shown crossing crosswalk 403A, entering intersection 406, crossing crosswalk 403B, and entering lane 404C. One or more image capture devices in each of image capture assemblies 401A-401D can capture images of vehicle 405A traversing the intersection 406 to monitor for compliance with traffic laws and pedestrian safety within the intersection and crosswalks. Similarly, vehicles 405C and 405D may also traverse the intersection and crosswalks, and enter, e.g. lane 404C. Image capture assemblies 401A-401D can monitor the vehicles as a part of a traffic monitoring service. One or more traffic lights 402A-402D may also be shown in images captured by image capture assemblies 401A-401D.

FIG. 5 illustrates a method 500 of implementing deep neural network functional module deduplication, according to one embodiment. Method 500 can be practiced on hardware as described above with reference to FIG. 3.

In operation 501, one or more vehicle objects and one or more human objects are detected in an image received from an image capture device. The detecting is performed using a single detection function comprising a single artificial intelligence (AI) model that is trained to detect both vehicle objects and human objects. Each of the detected objects (vehicle and human) corresponds to a portion of the captured image.

In operation 502, for each of the one or more vehicle objects, the portion of the image corresponding to the vehicle object is processed to determine a plurality of properties of the vehicle object, and to generate annotations of the portion of the image corresponding to the vehicle object. Vehicle object properties can include a license number of the vehicle, a type of the vehicle (sedan, truck, motorcycle, van, SUV, et al.) and a color of the vehicle (e.g. white, black, silver, tan, red, green, blue, et al.) Vehicle object properties may further include a make, model, and year of manufacture of a vehicle. In some embodiments, vehicle object properties may further include a speed and a heading of the vehicle.

In operation 503, for each of the one or more human objects, the portion of the image corresponding to the human object is processed to determine a plurality of properties of the human object, and to generate annotations of the portion of the image corresponding to the human object. Human object properties can include a gender of a person, a hair color, an eye color, a skin tone, facial landmarks for facial recognition, and the like.

In operation 504, annotations can be assembled, e.g. as metadata of the captured image, and the image and annotations are transmitted to a service or application that utilizes the annotated image to perform a function, such as traffic control, crosswalk monitoring, security monitoring, or navigating an autonomous driving vehicle.

Figure 6A:
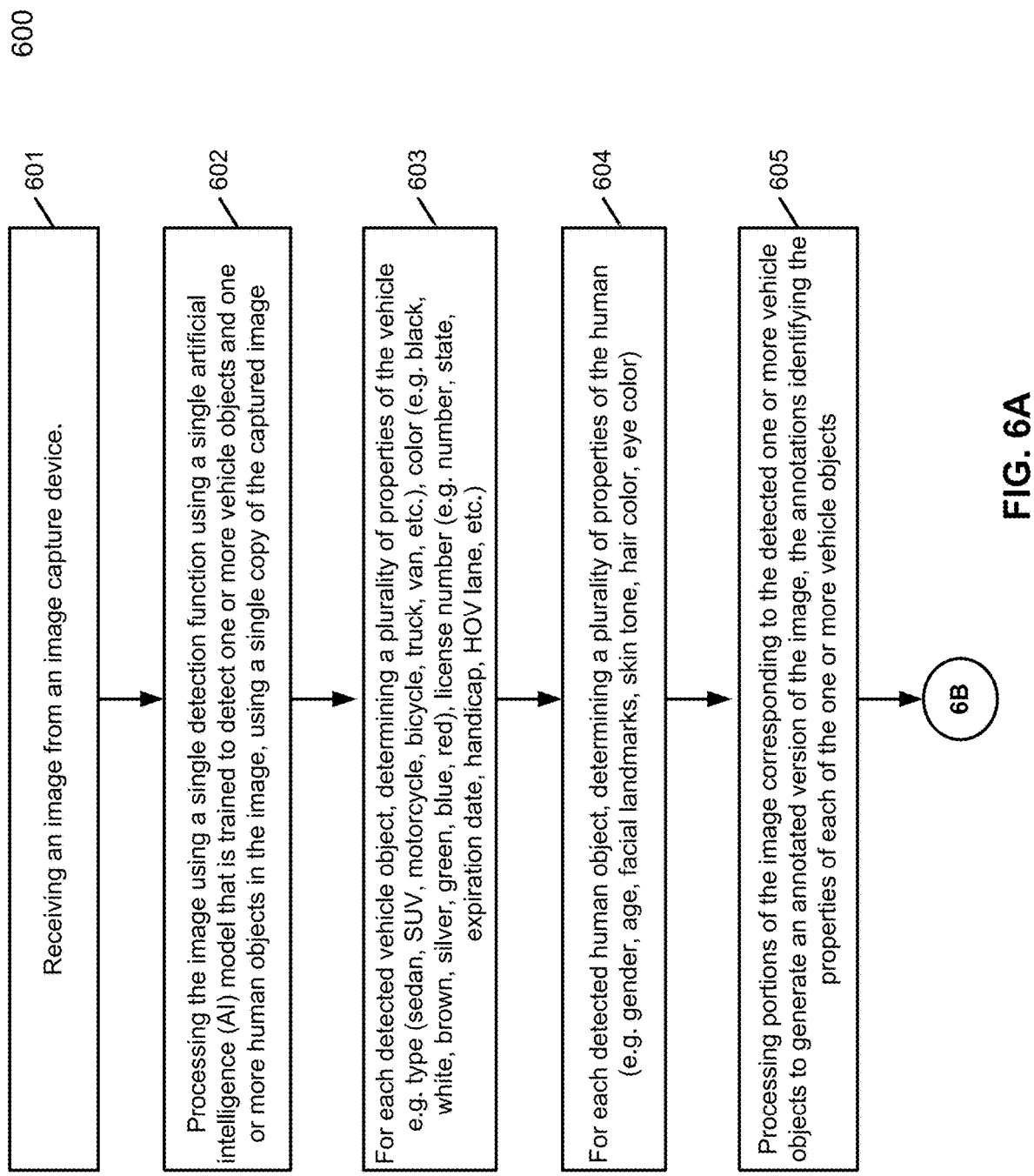
FIGS. 6A and 6B illustrate a method of implementing deep neural network functional deduplication, according to one embodiment.
Figure 6B:
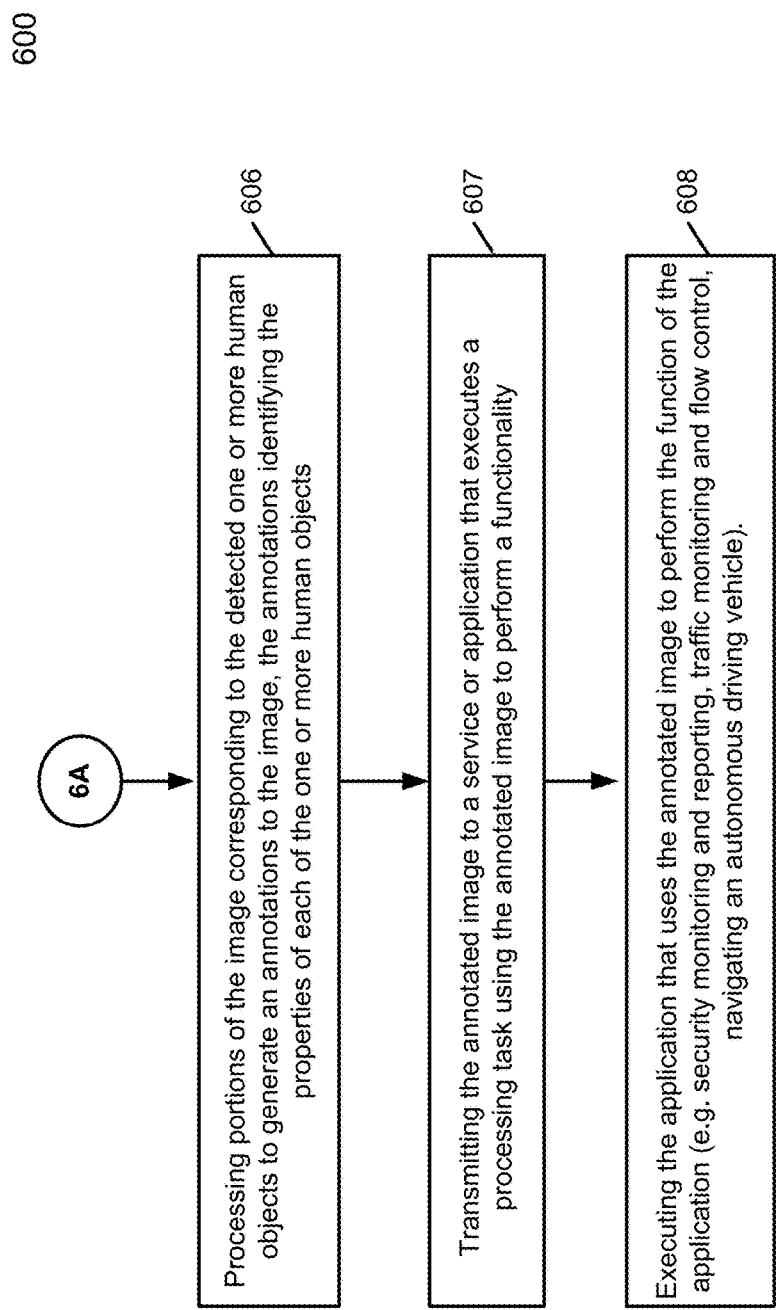

FIGS. 6A and 6B illustrate a method 600 of implementing deep neural network functional module deduplication, according to one embodiment. Method 600 can be practiced on hardware as described above with reference to FIG. 3, and in applications such as are described above with reference to FIGS. 1A and 1B, above.

In operation 601, an image processing system, e.g. image processing system 300, can receive an image from an image capture device.

In operation 602, the captured image can be processed with a single detection function using a single artificial intelligence (AI) model that is trained to detect one or more vehicle objects and one or more human objects in the image received from an image capture device. In an embodiment, the single detection function detects both human objects and vehicle objects using a single copy of the captured image. In an embodiment, the single detection function and single AI model can be kept in cache, instead of reloading the detection function and AI model upon receiving each image to process. The detecting is performing using a single pass of a single detection function comprising a single artificial intelligence (AI) model that is trained to detect both vehicle objects and human objects. Each of the detected objects (vehicle and human) corresponds to a portion of the captured image.

In operation 603, for each of the one or more vehicle objects detected in the captured image, the portion of the image corresponding to the vehicle object is processed to determine a plurality of properties of the vehicle object. Vehicle object properties can include a license number of the vehicle, a type of the vehicle (sedan, truck, motorcycle, van, SUV, et al.) and a color of the vehicle (e.g. white, black, silver, tan, red, green, blue, et al.) In an embodiment, vehicle properties can further include license attachments, such as a handicap sticker that authorizes a vehicle to park in handicap spaces, an expiration date of the license registration, and a sticker authorizing the vehicle to use high-occupancy vehicle (HOV) lanes. Vehicle object properties may further include a make, model, and year of manufacture of a vehicle. In some embodiments, the vehicle properties can further include a speed and heading of the vehicle.

In operation 604, for each of the one or more human objects, the portion of the image corresponding to the human object is processed to determine a plurality of properties of the human object. Human object properties can include a gender of a person, a hair color, an eye color, a skin tone, facial landmarks for facial recognition, and the like.

In operation 605, for each of the one or more vehicle objects, the portion of the captured image that corresponds to the vehicle object is processed to generate an annotated and/or enhanced version of the portion of the image corresponding to the vehicle object. Annotation can include generating metadata that describes the portion of the image within the captured image that corresponds to the vehicle object and generating metadata that describes the properties of the vehicle object that were detected in operation 603. Enhancement can include interpolating pixels within the portion of the image corresponding to the vehicle object, zooming in within the portion of the image, processing the image to enhance contrast, or color, reduce glare, or other visual enhancement function.

Referring now to FIG. 6B, in operation 606, for each of the one or more human objects, the portion of the captured image that corresponds to the human object is processed to generate an annotated and/or enhanced version of the portion of the image corresponding to the human object. Annotation can include generating metadata that describes the portion of the image within the captured image that corresponds to the human object and generating metadata that describes the properties of the human objects that were detected in operation 603. Enhancement can include interpolating pixels within the portion of the image corresponding to the human object, zooming in within the portion of the image, processing the image to enhance contrast, or color, reduce glare, or other visual enhancement function.

In operation 607, annotations for both the human objects and vehicle objects can be assembled, e.g. as metadata of the captured image, and the image and annotations are transmitted to a service or application that utilizes annotated image to perform a function, such as traffic control, crosswalk monitoring, security monitoring, or navigating an autonomous driving vehicle.

In operation 608, the service or application is executed and uses annotated image to perform the function of application or service (e.g. security monitoring and reporting, traffic monitoring and flow control, crosswalk monitoring, or navigating an autonomous driving vehicle).

It should be borne in mind, however, that all of these and similar terms are to be associated with appropriate physical quantities and are merely convenient labels applied to these quantities. Unless specifically stated otherwise as apparent from above discussion, it is appreciated that throughout the description, discussions utilizing terms such as those set forth in the claims below, refer to action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   detecting one or more vehicle objects and one or more human objects in an image, using a single detection function comprising a single artificial intelligence (AI) model, each of the one or more vehicle objects and one or more human objects corresponding to a portion of the image, the single AI model having a substantially same number of nodes and layers and being substantially a same size in memory as an AI model that detects only the one or more vehicle objects or detects only the one or more human objects, the single detection function and the single AI model remaining resident in memory, between processing the image and processing a second image, wherein when the second image is received, the second image is processed without reloading the single AI model into the memory;
   for each of the one or more vehicle objects, processing a corresponding portion of the image to determine a plurality of properties of a vehicle object based on a first weight of the single AI model, and to generate annotations of the one or more vehicle objects in the corresponding portion of the image with the plurality of properties of the vehicle object;
   for each of the one or more human objects, processing a corresponding portion of the image to determine a plurality of properties of a human object based on a second weight of the single AI model, and to generate annotations of the one or more human objects in the corresponding portion of the image with the plurality of properties of the human object;
   assembling annotations of the one or more vehicle objects and annotations of one or more human objects as metadata of the image, wherein the metadata of the image includes metadata that describes the portion of the image within the image that corresponds to the one or more vehicle objects and the properties of the one or more vehicle objects and metadata that describes the portion of the image within the image that corresponds to the one or more human objects and the properties of the one or more human objects, the properties of the one or more vehicle objects including a type of vehicle, a license number of the vehicle, and a color of the vehicle, the properties of the one or more human objects including an approximate age of a person, a skin tone, an eye color, a hair color, a gender, and facial landmarks of the person's face; and
   transmitting the image, with annotations of the one or more vehicle objects and the annotations of one or more human objects being assembled, to a service or application that utilizes an annotated image to perform a function of the service or application.

2. The method of claim 1, wherein the one or more human objects and the one or more vehicle objects are detected and processed using a single copy of the image.

3. The method of claim 1, wherein the single detection function and single AI model remain cached across iterations of the method of claim 1.

4. The method of claim 1, wherein the plurality of properties of the vehicle object properties include a license number, a type of vehicle, and a color of vehicle detected in the vehicle object.

5. The method of claim 1, wherein the plurality of properties of the human object properties include an approximate age, hair color, and face landmarks of the human detected in the human object.

6. A non-transitory machine-readable medium having instructions stored therein, which when executed by a processor, cause the processor to perform operations, the operations comprising:
 detecting one or more vehicle objects and one or more human objects in an image, using a single detection function comprising a single artificial intelligence (AI) model, each of the one or more vehicle objects and one or more human objects corresponding to a portion of the image, the single AI model having a substantially same number of nodes and layers and being substantially a same size in memory as an AI model that detects only the one or more vehicle objects or detects only the one or more human objects, the single detection function and the single AI model remaining resident in memory, between processing the image and processing a second image, wherein when the second image is received, the second image is processed without reloading the single AI model into the memory;
 for each of the one or more vehicle objects, processing a corresponding portion of the image to determine a plurality of properties of a vehicle object based on a first weight of the single AI model, and to generate annotations of the one or more vehicle objects in the corresponding portion of the image with the plurality of properties of the vehicle object;
 for each of the one or more human objects, processing a corresponding portion of the image to determine a plurality of properties of a human object based on a second weight of the single AI model, and to generate annotations of the one or more human objects in the corresponding portion of the image with the plurality of properties of the human object;
 assembling annotations of the one or more vehicle objects and annotations of one or more human objects as metadata of the image, wherein the metadata of the image includes metadata that describes the portion of the image within the image that corresponds to the one or more vehicle objects and the properties of the one or more vehicle objects and metadata that describes the portion of the image within the image that corresponds to the one or more human objects and the properties of the one or more human objects, the properties of the one or more vehicle objects including a type of vehicle, a license number of the vehicle, and a color of the vehicle, the properties of the one or more human objects including an approximate age of a person, a skin tone, an eye color, a hair color, a gender, and facial landmarks of the person's face; and
 transmitting the image, with annotations of the one or more vehicle objects and the annotations of one or more human objects being assembled, to a service or application that utilizes an annotated image to perform a function of the service or application.

7. The medium of claim 6 wherein the one or more human objects and the one or more vehicle objects are detected and processed using a single copy of the image.

8. The medium of claim 6, wherein the single detection function and single AI model remain cached across iterations of the operations of claim 7.

9. The medium of claim 6, wherein the plurality of properties of the vehicle object properties include a license number, a type of vehicle, and a color of vehicle detected in the vehicle object.

10. The medium of claim 6, wherein the plurality of properties of the human object properties include an approximate age, hair color, and face landmarks of the human detected in the human object.

11. A data processing system, comprising:
 a processor; and
 a memory coupled to the processor to store instructions, which when executed by the processor, cause the processor to perform operations, the operations including:
 detecting one or more vehicle objects and one or more human objects in an image, using a single detection function comprising a single artificial intelligence (AI) model, each of the one or more vehicle objects and one or more human objects corresponding to a portion of the image, the single AI model having a substantially same number of nodes and layers and being substantially a same size in memory as an AI model that detects only the one or more vehicle objects or detects only the one or more human objects, the single detection function and the single AI model remaining resident in memory, between processing the image and processing a second image, wherein when the second image is received, the second image is processed without reloading the single AI model into the memory;
 for each of the one or more vehicle objects, processing a corresponding portion of the image to determine a plurality of properties of a vehicle object based on a first weight of the single AI model, and to generate annotations of the one or more vehicle objects in the corresponding portion of the image with the plurality of properties of the vehicle object;
 for each of the one or more human objects, processing a corresponding portion of the image to determine a plurality of properties of a human object based on a second weight of the single AI model, and to generate annotations of the one or more human objects in the corresponding portion of the image with the plurality of properties of the human object;
 assembling annotations of the one or more vehicle objects and annotations of one or more human objects as metadata of the image, wherein the metadata of the image includes metadata that describes the portion of the image within the image that corresponds to the one or more vehicle objects and the properties of the one or more vehicle objects and metadata that describes the portion of the image within the image that corresponds to the one or more human objects and the properties of the one or more human objects, the properties of the one or more vehicle objects including a type of vehicle, a license number of the vehicle, and a color of the vehicle, the properties of the one or more human objects including an approximate age of a person, a skin tone, an eye color, a hair color, a gender, and facial landmarks of the person's face; and
 transmitting the image, with annotations of the one or more vehicle objects and the annotations of one or more human objects being assembled, to a service or application that utilizes an annotated image to perform a function of the service or application.

12. The system of claim 11, wherein the system further comprises:
 an AI accelerator that includes a central processing unit (CPU) and at least one of a graphics processing unit (GPU) or a visual processing unit (VPU).

13. The system of claim 12, wherein the AI accelerator further comprises an image capture device.

14. The system of claim 11, wherein the one or more human objects and the one or more vehicle objects are detected and processed using a single copy of the image.

15. The system of claim 11, wherein the single detection function and single AI model remain cached in the memory across iterations of the operations of claim 13.

16. The system of claim 11, wherein the plurality of properties of the vehicle object properties include a license number, a type of vehicle, and a color of vehicle detected in the vehicle object.

17. The system of claim 11, wherein the human object properties include an approximate age, hair color, and face landmarks of the human detected in the human object.

\* \* \* \* \*